Patented Oct. 14, 1930

1,778,343

UNITED STATES PATENT OFFICE

EDOUARD URBAIN, OF PARIS, FRANCE, ASSIGNOR TO URBAIN CORPORATION, A CORPORATION OF DELAWARE

PROCESS OF PRODUCING CARBON FOR ABSORPTION AND DECOLORIZING

No Drawing. Application filed July 17, 1928, Serial No. 293,486, and in France July 20, 1927.

In my earlier Patent No. 1,610,399, dated December 14, 1926, I describe a process for producing active carbon by impregnating vegetable material with a substance comprising the $PO_4$ radical, after which the material is dried and calcined at a temperature above 800° C. I have now found that the advantageous effect in the removal of hydrogen is primarily due to the phosphorus rather than to the action of the oxygen.

Following this discovery I have found that carbon can be given great activity by passing phosphorus vapors through the carbon. Thus cocoanut charcoal produced at a relatively low temperature, which contains from 6 to 12% of its weight of combined hydrogen, can be activated by passing phosphorus vapors through it for several hours while maintaining the charcoal at a temperature above 350° C. Higher temperatures may be used, but no particular benefit appears to be had above about 700° C., and at high temperatures there is danger of burning the carbon if any oxygen is present. At a temperature of between 500° and 700° C. only a small amount of the phosphorus is absorbed, say, from 4 to 6% of the weight of the carbon. However, if one collects the gases and vapors which have passed through the carbon, it is found that hydrogen and phosphorus-hydrogen compounds are present.

Presumably the hydrogen is produced by a secondary reaction from the decomposition of the phosphorus-hydrogen compounds, and these compounds are formed by the action of phosphorus on the combined hydrogen contained in the carbon. After the absorbed phosphorus is removed from the carbon the latter is found to possess very great activity. In order to remove the phosphorus the carbon can be calcined at a high temperature in a non-oxidizing atmosphere, or the phosphorus can be oxidized in place in the carbon and then the resulting phosphoric acid can be washed out.

In carrying out this process commercially, the original charcoal should be formed at a low temperature, for example, below 600° C. and preferably is made from a dense material such as the cocoanut shells referred to, or from hardwood. In passing the phosphorus vapors through the charcoal they are preferably mixed with superheated steam, and a small amount of hydrochloric acid or other catalyst is added as explained in my co-pending application, Ser. No. 185,662, filed April 21, 1927. As a result of this procedure, the phosphorus is oxidized in the carbon to form phosphoric acid and the charcoal is at the same time activated. The vapors which pass through the carbon comprise hydrogen, and a small amount of carbon monoxide. This operation is preferably conducted at a temperature of between 500° and 700° C. The phosphoric acid is washed from the carbon and the washing is continued until the wash water contains only traces of phosphoric acid. The treatment of the carbon can be conducted as a continuous operation in an appropriate form of retort or it can be conducted as a batch operation.

By carrying out the process as described, one can produce carbons which retain approximately the original density of the charcoal treated so that one can have an absorptive agent of great activity in small volume. This process is also of great advantage in revivifying carbons which have lost their activity, especially carbons employed in the recovery of benzol or the treatment of illuminating gases, which revivification has heretofore been practically impossible. Accordingly, when I use the expression "activating carbon", I intend to include the revivifying of used active carbon whether of an absorptive or a decolorizing grade, as well as a preliminary activation of charcoal.

What I claim is:

1. The method of activating carbon which comprises the step of treating the carbon at a temperature above 350° C. with phosphorus vapors.

2. The method of activating carbon which comprises the steps of passing a mixture comprising phosphorus vapors and steam into carbon at a temperature above 350° C. and washing out absorbed reaction products.

EDOUARD URBAIN.